(12) United States Patent
Stewart et al.

(10) Patent No.: US 7,764,181 B2
(45) Date of Patent: Jul. 27, 2010

(54) INDUCTIVELY COUPLED LOOP ANTENNA FOR A RADIO FREQUENCY IDENTIFICATION READER

(75) Inventors: Robert Stewart, Boulder, CO (US); Jacques Martin, Dardilly (FR)

(73) Assignee: Allflex USA, Inc., DFW Airport, TX (US)

( * ) Notice: Subject to any disclaimer, the term of this patent is extended or adjusted under 35 U.S.C. 154(b) by 254 days.

(21) Appl. No.: 11/825,108

(22) Filed: Jul. 3, 2007

(65) Prior Publication Data

US 2009/0009335 A1 Jan. 8, 2009

(51) Int. Cl.
*G08B 13/14* (2006.01)
*G08B 23/00* (2006.01)

(52) U.S. Cl. .............. 340/573.1; 340/572.1; 340/572.5; 340/572.7; 340/572.8

(58) Field of Classification Search .............. 340/572.7, 340/573.1
See application file for complete search history.

(56) References Cited

U.S. PATENT DOCUMENTS

| 2,379,800 | A | | 7/1945 | Hare |
| 6,169,483 | B1 | | 1/2001 | Ghaffari et al. |
| 6,329,920 | B1 | * | 12/2001 | Morrison et al. ......... 340/573.3 |
| 7,151,455 | B2 | | 12/2006 | Lindsay et al. |
| 7,541,930 | B2 | | 6/2009 | Saarisalo et al. |
| 2005/0080636 | A1 | * | 4/2005 | Markwitz et al. .............. 705/1 |
| 2005/0099306 | A1 | * | 5/2005 | Gilfix et al. .............. 340/573.1 |
| 2005/0146472 | A1 | * | 7/2005 | Ihara et al. .................. 343/718 |
| 2005/0168385 | A1 | | 8/2005 | Baker |

(Continued)

OTHER PUBLICATIONS

International Search Report for Int'l Application PCT/US2007/0115505 filed Jul. 3, 2007; report completed Nov. 21, 2007; mailed Feb. 7, 2008, 2 pgs.

(Continued)

*Primary Examiner*—Benjamin C Lee
*Assistant Examiner*—Andrew Bee
(74) *Attorney, Agent, or Firm*—Kauth, Pomeroy, Peck & Bailey LLP (57) ABSTRACT

Systems and methods are described for reading EID tags in difficult to reach locations using a portable RFID reader. In many embodiments, the system includes a portable RFID reader and one or more stationary antenna assemblies. The stationary antenna assemblies typically include a loop antenna in a first location and a ferrite antenna in a second location. EID tags in the reading zone of the loop antenna can be read using the portable RFID reader via an inductive coupling between the resonant antenna in the portable RFID reader and the ferrite antenna in the stationary antenna assembly. One embodiment of the invention includes a portable reader having reader circuitry configured to generate an activation signal, a first resonant antenna, where the first resonant antenna is electrically connected to the reader circuitry, a reader housing containing the reader circuitry and the first resonant antenna, and a stationary antenna assembly having a resonant antenna unit including a housing and a second resonant antenna, a loop antenna unit including a housing and a loop antenna and an electrical connection between the resonant antenna unit and the loop antenna unit. In addition, the first resonant antenna in the portable reader is inductively coupled to the second resonant antenna in the stationary antenna assembly.

25 Claims, 6 Drawing Sheets

U.S. PATENT DOCUMENTS

| | | | |
|---|---|---|---|
| 2005/0208889 A1* | 9/2005 | Baker et al. ..................... | 455/7 |
| 2006/0208899 A1 | 9/2006 | Suzuki et al. | |
| 2007/0008140 A1* | 1/2007 | Saarisalo et al. ......... | 340/572.7 |
| 2007/0008152 A1 | 1/2007 | Parias | |
| 2007/0023517 A1 | 2/2007 | Tan et al. | |
| 2007/0171073 A1* | 7/2007 | Ariyoshi et al. .......... | 340/572.7 |
| 2007/0222603 A1 | 9/2007 | Lai et al. | |
| 2008/0068173 A1* | 3/2008 | Alexis et al. ............. | 340/572.7 |
| 2008/0252426 A1* | 10/2008 | Lee et al. ................... | 340/10.3 |

OTHER PUBLICATIONS

Written Opinion for Int'l Application PCT/US2007/0115505 filed Jul. 3, 2007; report completed Nov. 21, 2007; mailed Feb. 7, 2008, 3 pgs.

Finkenzeller, "Components of an RFID System", RFID Handbook Radio-Frequency Identification Fundamentals and Applications, 1999, 5 pgs.

* cited by examiner

INDUCTIVELY COUPLED LOOP ANTENNA FOR A RADIO FREQUENCY IDENTIFICATION READER

FIELD OF THE INVENTION

This invention relates to radio frequency identification (RFID) systems and, more particularly, to an RFID reader system including a resonant frequency antenna circuit that magnetically couples with electronic identification tags.

BACKGROUND

Passive low frequency RFID readers and tags use operating principles that are well-known to those of ordinary skill in the art, and that are described in extensive detail in several seminal inventions, including U.S. Pat. No. 1,744,036 to Brard, U.S. Pat. No. 3,299,424 to Vinding, U.S. Pat. No. 3,713,148 to Cardullo et al., and U.S. Pat. No. 5,053,774 to Schuermann et al., and in textbooks such as Finkenzeller, "RFID Handbook" ($1^{st}$ Edition, 1999). The disclosure of U.S. Pat. Nos. 1,744,036 3,299,424, 3,713,148 and 5,053,774 and the "RFID Handbook" is incorporated herein by reference in its entirety In RFID systems of this type, the reader (also sometimes referred to as a scanner or interrogator) device generates a tag activation signal, and receives identification data signals from the electronic identification (EID) tag. Such a reader device can use separate transmit and receive antenna elements to perform these functions. Readers in which a single antenna performs both transmit and receive functions are typically economical and efficient, and are commonly used in low-frequency RFID reader designs.

Figure 1:
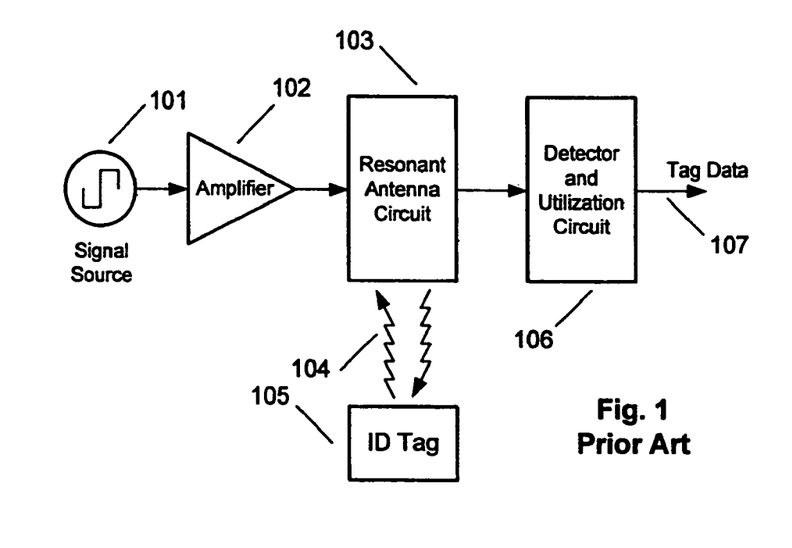
FIG. 1 illustrates the basic components and operation of a conventional radio frequency identification (RFID) system that uses passive electronic identification (EID) tags.

An example of the circuitry of a conventional RFID system capable of reading EID tags is shown in FIG. 1. The reader includes circuitry, which generates an activation signal (usually a single frequency unmodulated signal) using a signal source 101 and an amplifier 102 to drive a resonant antenna circuit 103. This activation, signal is manifest as a time-varying electromagnetic field, which couples with the EID tag 105 by means of the electromagnetic field's magnetic field component 104. The EID tag 105 converts this magnetic field into an electrical voltage and current, and uses this electrical power to activate its internal electronic circuitry. Using any of several possible modulation schemes, the EID tag conveys binary encoded information stored within it back to the reader via the magnetic field 104, where the detector and utilization circuit 106 converts this binary code into alphanumeric format tag data 107 in accordance with some prescribed application.

Figure 2:
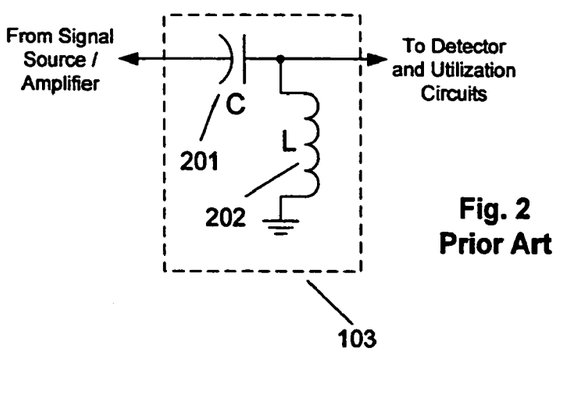
FIG. 2 is a circuit diagram of the inductive and capacitive components of the resonant antenna circuit shown in FIG. 1.
Figure 3:
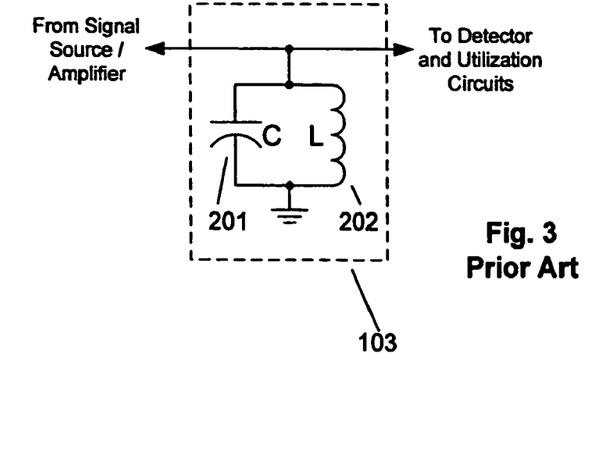
FIG. 3 shows a circuit diagram of an alternate wiring arrangement for the components in FIG. 2.

The resonant antenna circuit 103 in FIG. 1 typically includes at least one inductive and one capacitive circuit element. Examples of resonant antenna circuits are shown in FIGS. 2 and 3. In each circuit, the capacitive element 201 is connected to the inductive element 202. Functionally, the inductive element 202 radiates a magnetic field when driven by a time varying signal. Conversely, when exposed to a time varying magnetic field, current flow is induced in the inductive element 202, resulting in a time varying signal that appears at the resonant antenna circuit's connection points. These phenomena are well known to be consistent with a principle of physics known as Faraday's Law.

FIG. 2 illustrates a series-wired arrangement of the inductor 202 and capacitor 201, and FIG. 3 illustrates a parallel-wired arrangement of these same components. Either arrangement may be used in an RFID reader depending on other design attributes, such as the configuration of Amplifier 102 and/or the Detector and Utilization Circuit 106. In either case, the selection of inductor and capacitor values are determined by the equation $F_R=1/2\pi \sqrt{LC}$, which is well known to those of ordinary skill in the art. For example, if the capacitance C of the capacitor 201 is 5 nF (i.e., $5\times10^{-9}$ Farads) and the inductance L of the inductor 202 is 281 uH (i.e., $281\times10^{-6}$ Henries), then the resonant frequency is expected to be 134.27 kilohertz (KHz). A variety of values for L and C can be combined to produce a particular resonant frequency $F_R$, and the selection of specific values generally depends on typical design considerations.

Since the purpose of the inductor 202 is to radiate and sense a magnetic field, the inductor is typically designed to optimize this capability. For low frequency RFID systems, the inductor (which is regarded as an antenna) is most frequently realized as multiple turns of an electrically conductive material, such as copper wire. In some applications, the multiple turns of wire (which can have any imaginable geometric shape) can be wound on a dielectric core or bobbin, the core or bobbin having no influence on the resulting inductance value. Such an antenna coil is often referred to as an "air-core antenna". Alternately, the multiple turns of wire can be wound on a ferrous core or bobbin, the ferrous material having a pronounced influence on the resulting inductance value of the coil, as well as an influence on the shape of the magnetic field that the inductor radiates and senses. Such antennas are commonly referred to as ferrite-core antennas.

In many electronic identification applications, the reader device and antenna comprise stationary elements, being fixed in location and capable of reading compatible EID tags when the tags enter the reading zone of the reader's antenna. An antenna associated with a stationary reader can be of any size and/or method of construction. A common example of an antenna used in conjunction with a stationary reader is a loop antenna.

Figure 4:
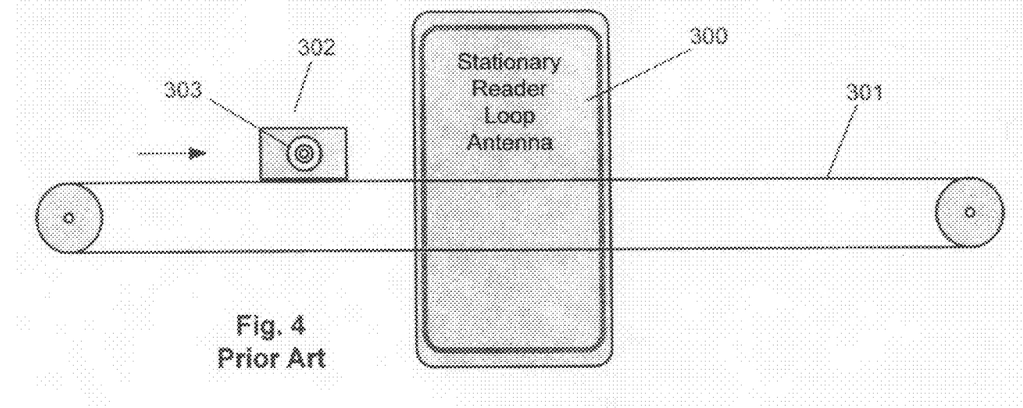
FIG. 4 shows a stationary RFID reader that can be used to obtain identification information from EID tags fixed to items on a conveyor belt.
Figure 5:
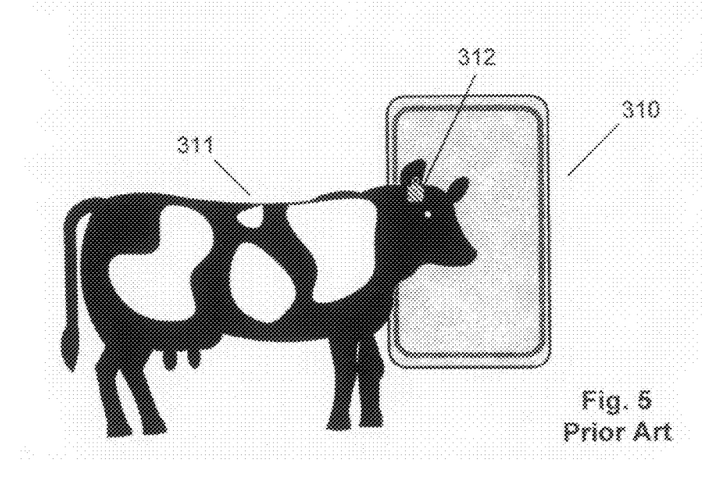
FIG. 5 shows a stationary RFID reader that can be used to obtain identification information from EID tags affixed to livestock.

A stationary reader including a loop antenna is shown in FIG. 4. The reader includes a stationary loop antenna 300 that is located proximate a conveyor 301 that carries objects 302 to which EID tags 303 are attached. As the objects pass by the reader's antenna and enter the reader's read zone, the reader's activation signal energizes the EID tag, whereupon the tag transmits its data contents to the reader. Another stationary reader is shown in FIG. 5, which is useful in livestock identification applications. The reader includes a fixed loop antenna 310 and each animal 311 is tagged with an EID tag 312, commonly in the form of an eartag. As the animals pass through a lane that restricts the animals to single file movement, the eartags are read sequentially by the stationary reader and loop antenna.

Figure 6:
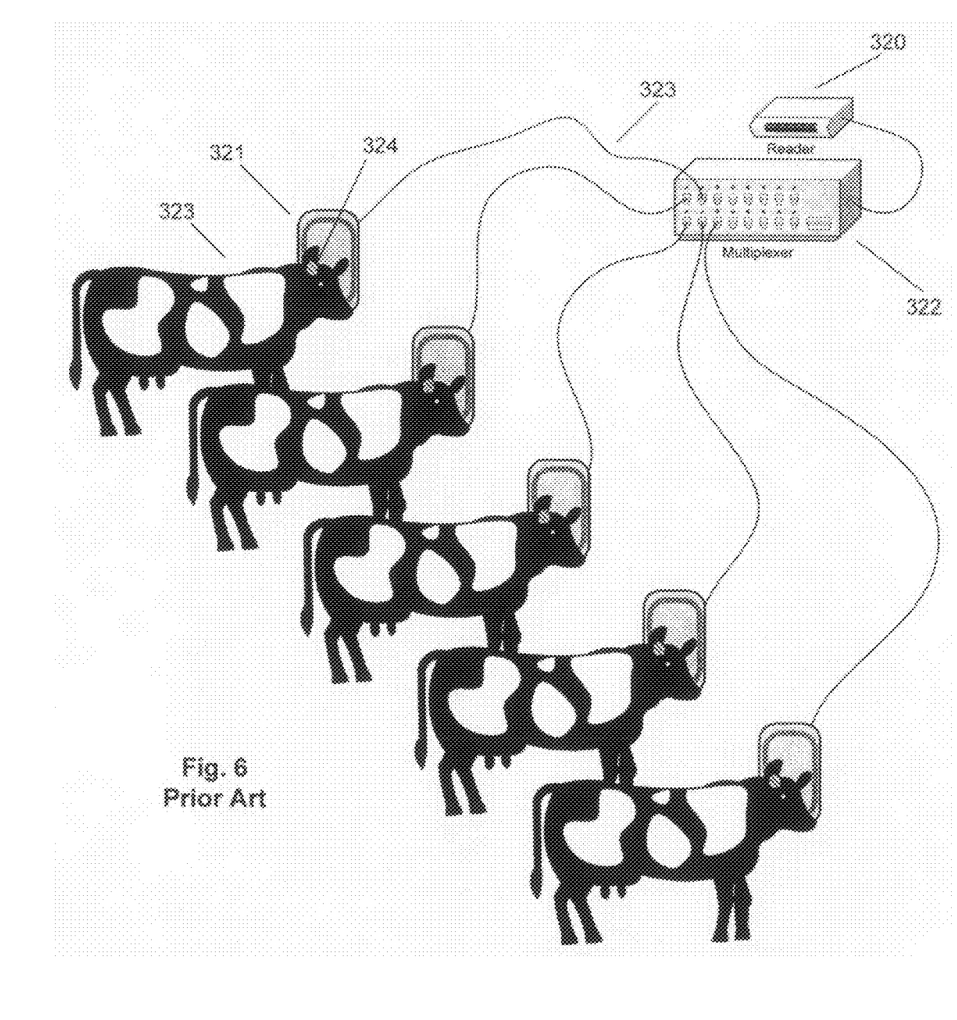
FIG. 6 illustrates a stationary RFID reader that includes multiplexed loop antennas that can be used to obtain identification information from EID tags affixed to livestock in a number of different locations.

A stationary reader for use in livestock identification applications where animals stop and remain for some period of time is illustrated in FIG. 6. The reader 320 is connected to a number of stationary loop antennas 321 via a multiplexer 322. In the illustrated system, wires connect the wireless loop antennas to the multiplexer. When an animal 323 bearing an EID tag 324, such as an eartag, approaches the read zone of the loop antenna, identification information can be obtained from the EID tag by the reader. In a number of applications, an animal. will approach a loop antenna for a particular purpose, such as feeding, milking, branding, or immunizing. In these circumstances, the identification information associated with the animal's EID tag can be correlated with other data, such as milk metering, feed dispensation, physiological data assessment, etc.

In many of the stationary reader applications described above, reader equipment and installation costs are high and reader utilization rates are low. For example, the system shown in FIG. 5 is implemented using individual readers for each animal station, which is expensive and poses reliability consequences due to the multiplicity of readers. The number of readers can be reduced by using a single reader that is multiplexed with a group of antennas (see FIG. 6), however, this typically involves the cost of installing wiring between the loop antennas and the multiplexer and the cost of the multiplexer itself.

Portable readers are an alternative to stationary readers. A portable reader can be carried by a worker, who can then move between animals reading EID tags using the portable reader. A disadvantage that can be encountered when using a portable reader is that the worker is frequently operating at the posterior of an animal while the animal's EID tag is attached to the animal's ear (i.e. the animal's anterior). Therefore, use of a conventional portable reader to read an animal's EID tag can pose a physical accessibility problem and in some cases pose physical hazards to the worker.

SUMMARY OF THE INVENTION

Systems and methods are described for providing a portable RFID reader configured to inductively couple with a loop antenna. In many embodiments, a loop antenna is located in a location that is advantageous for interrogating EID tags and the loop antenna is electrically connected to a resonant antenna in a second location that is conveniently accessible by a worker. A portable RFID reader can inductively couple to the resonant antenna and cause the loop antenna to both activate an EID tag within the reading zone of the loop antenna and receive identification information from the EID tag. In many embodiments, multiple readers are not required and the amount of wiring within the system can be significantly less than that required in a multiplexed reader system serving a similar number of locations.

One embodiment of the invention includes a portable reader having reader circuitry configured to generate an activation signal, a first resonant antenna, where the first resonant antenna is electrically connected to the reader circuitry, a reader housing containing the reader circuitry and the first resonant antenna, and a stationary antenna assembly having a resonant antenna unit including a housing and a second resonant antenna, a loop antenna unit including a housing and a loop antenna and an electrical connection between the resonant antenna unit and the loop antenna unit. In addition, the first resonant antenna in the portable reader is inductively coupled to the second resonant antenna in the stationary antenna assembly.

In a further embodiment, the reader circuitry is configured to generate an activation signal that causes the first resonant antenna to generate a time varying magnetic field.

In another embodiment, the portable reader includes an activation switch and the reader circuitry is configured to generate the activation signal in response to the activation switch being pressed.

In a still further embodiment, the first resonant antenna and the second resonant antenna are configured so that the second resonant antenna generates a time varying electrical signal indicative of a time varying magnetic field generated by the first resonant antenna, the electrical connection is configured to convey electrical signals from the second resonant antenna to the loop antenna and the loop antenna is configured to generate a time varying magnetic field indicative of a time varying electrical signal generated by the second resonant antenna.

In still another embodiment, the loop antenna is configured to receive information data from an electronic identification tag.

In a yet further embodiment, the loop antenna is configured to generate a time varying electrical signal indicative of received information data and to provide the electrical signal to the second resonant antenna via the electrical connection, the second antenna is configured to generate a time varying magnetic field indicative of an electrical signal generated by the loop antenna, the first resonant antenna is configured to generate a time varying electrical signal indicative of a time varying magnetic field generated by the second resonant antenna and to provide the time varying electrical signal to the reader circuitry via the electrical connection between the first resonant antenna and the reader circuitry and the reader circuitry is configured to extract information data from the time varying electrical signal received from the first resonant antenna.

In yet another embodiment, at least one of the resonant antennas is a ferrite antenna.

In a further embodiment again, the ferrite antenna includes a ferrite core, an insulating form surrounding a portion of the ferrite core and a coil wrapped around the insulating form.

In another embodiment again, the ferrite core has a circular geometry,

In an additional further embodiment, both resonant antennas are ferrite antennas.

In another additional embodiment, both of the ferrite antennas include a circular geometry, have the same cross-section geometry and include the same number of turns.

In a still yet further embodiment, at least one of the resonant antennas is an air-core antenna.

In still yet another embodiment, the electrical connection between the second resonant antenna and the loop antenna includes a pair of wires.

In a still further embodiment again, the housing of the resonant antenna unit includes a mechanical coupler configured to align the first resonant antenna in the portable reader with the second resonant antenna in the stationary antenna assembly.

In still another embodiment again, the first resonant antenna and second resonant antenna have circular cross sections, and the mechanical coupler is configured to attach the portable reader housing to the housing of resonant antenna unit so that the first and second resonant antennas are axially aligned.

A still further additional embodiment also includes an antenna identification tag located proximate the resonant antenna unit.

Still another additional embodiment includes a first antenna circuit contained within a first housing, a second antenna circuit contained within a second housing, and an electrical interconnection between the first and second antenna circuits.

In a yet further embodiment again, the first antenna is a ferrite antenna and the second antenna is a loop antenna.

In yet another embodiment again, the first antenna includes an inductor and a capacitor in a parallel configuration, and the second antenna includes an inductor and a capacitor in a parallel configuration.

An embodiment of the method of the invention includes inductively coupling the reader to a first antenna that is electronically connected to a second antenna, reading identification data from the animal electronic identification tag using the reader, when the animal electronic identification tag is located within the reading zone of second antenna, and directly reading identification data from the location electronic identification tag using the reader.

In a further embodiment of the method of the invention, the reader includes a ferrite antenna.

In another embodiment of the method of the invention, the first antenna is a ferrite antenna.

In a still further embodiment of the method of the invention, the second antenna is a loop antenna.

DETAILED DESCRIPTION OF THE INVENTION

Turning now to the drawings, embodiments of RFID reader systems are shown that include a portable RFID reader and a stationary antenna assembly. In many embodiments, the stationary antenna assembly includes a loop antenna that is electrically connected to a resonant antenna. The resonant antenna enables the inductive coupling of the portable RFID reader to the stationary antenna assembly. Once coupled, the portable RFID reader can activate EID tags within the reading zone of the loop antenna and obtain identification information from the activated EID tags.

Figure 7:
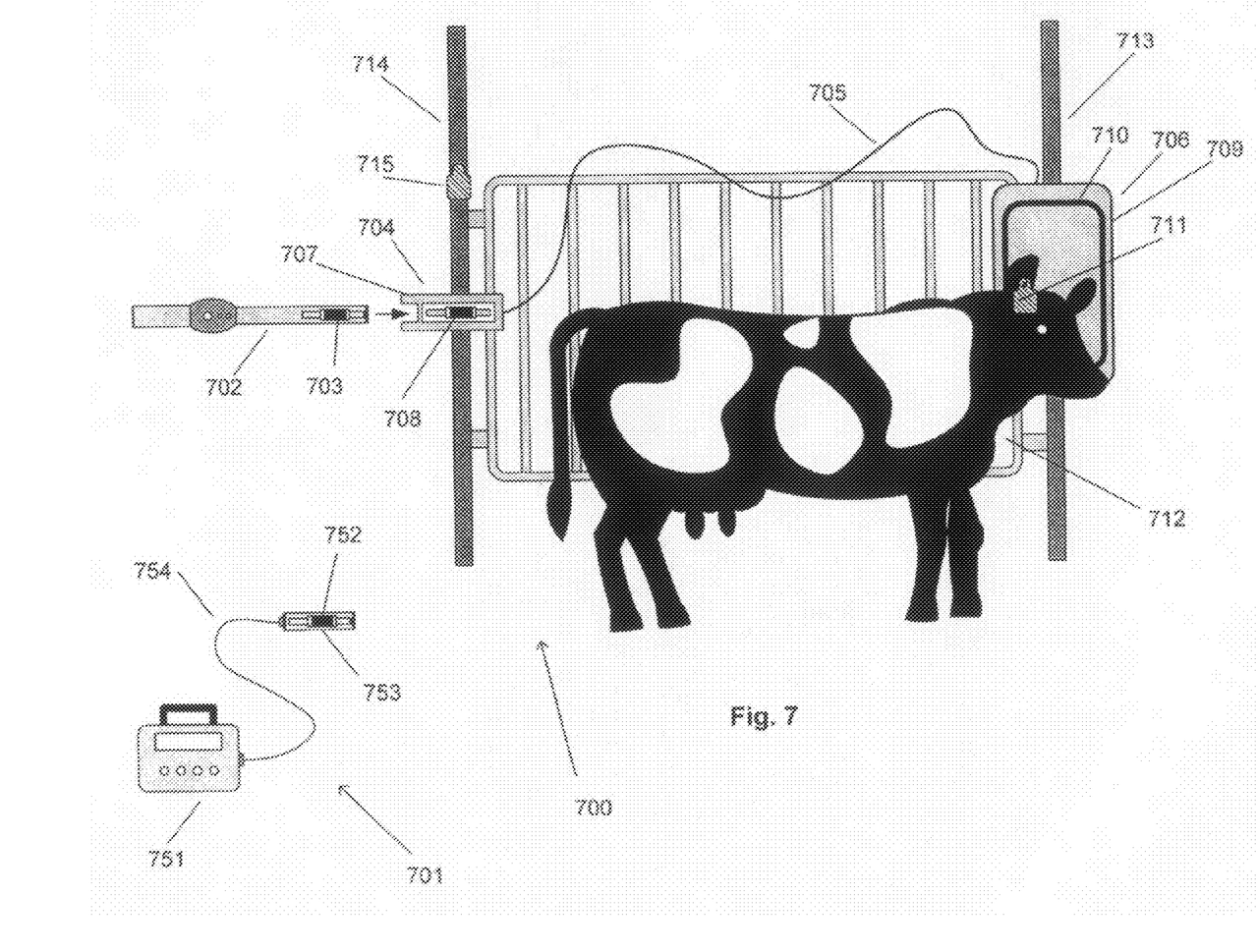
FIG. 7 illustrates an RFID reader system including a portable RFID reader and a stationary antenna assembly in accordance with an embodiment of the invention.

An embodiment of an RFID reader system including a portable RFID reader and a stationary antenna assembly in accordance with an embodiment of the invention is shown in FIG. 7. The RFID reader system 700 includes a portable RFID reader 702 and a stationary antenna assembly. In the illustrated embodiment, the portable RFID reader 702 includes reader electronics (not shown) and a resonant antenna 703. The stationary antenna assembly includes a resonant antenna unit 704 that is connected via an electrical connection 705 to a loop antenna unit 706.

The resonant antenna unit includes a housing 707 and a resonant antenna 708. In a number of embodiments the housing 707 includes a mechanical coupling to facilitate alignment of the resonant antenna 703 in the portable RFID reader 702 and the resonant antenna 708.

The loop antenna unit 706 includes a housing 709 and a loop antenna 710. In a number of embodiments, the loop antenna 710 is dimensioned and the loop antenna unit 706 located so that the reading zone of the loop antenna 710 encompasses a region in which EID tags are desired to be detected.

In the illustrated embodiment, the stationary antenna assembly is located within an animal containment and an EID eartag 711 is affixed to the ear of an animal 712 located within the animal containment. In order to ensure the EID eartag 711 is within the reading zone of the loop antenna, the loop antenna unit 706 is fixed to a portion 713 of the enclosure adjacent the head of the animal 712. Ease of access to the resonant antenna unit 704 is ensured by fixing it to a portion 714 of the enclosure proximate a work area. In the illustrated example, the work area is at the posterior of the animal 712.

The portable RFID reader 702 is configured to use the resonant antenna 703 to generate activation signals and to obtain identification information from an EID tag. When the resonant antenna 703 in the portable RFID reader 702 is inductively coupled to the resonant antenna 708 in the stationary antenna assembly, the portable RFID reader is able to activate and read EID tags within the reading zone of the loop antenna 710. In many embodiments, identification of the stationary antenna assembly used to capture information from an EID tag is desirable and so the stationary antenna assembly is itself identified with an antenna identification EID tag 715 located proximate the resonant antenna unit. When information from an animal has been obtained using the stationary antenna assembly, the portable RFID reader 702 can read the antenna identification EID tag 715 to obtain information concerning the location of the identified animal. In a number of embodiments, the location information can be used to associate the identified animal with other location specific information such as milk metering information, feed dispensation information and/or physiological data.

Figure 8:
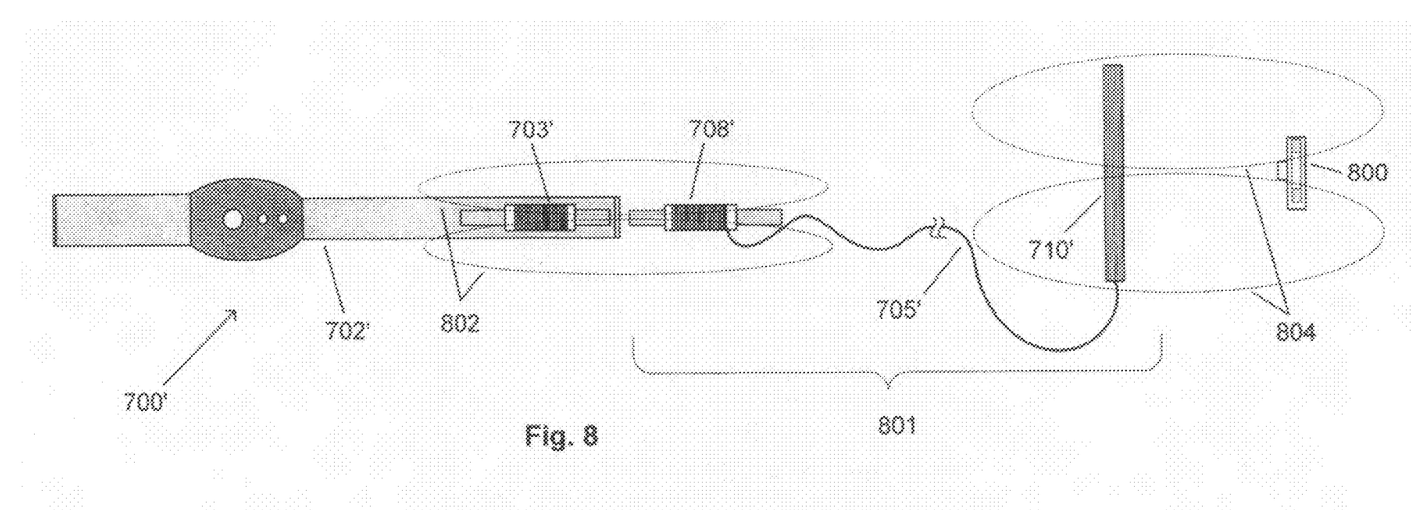
FIG. 8 conceptually illustrates an RFID reader system communicating with an EID tag in accordance with an embodiment of the invention.

An embodiment of an RFID reader system communicating with an EID tag is conceptually illustrated in FIG. 8. As with the embodiment shown in FIG. 7, the system 700' includes a portable RFID reader 702' including a resonant antenna 703' and a stationary antenna assembly 801 including a resonant antenna 708' connected to a loop antenna 710' via an electrical connection 705'. An EID tag 800 is aligned within the reading zone of the loop antenna 710'. The dashed lines 802 conceptually illustrate the inductive coupling between the resonant antenna 703' in the portable RFID reader 702' and the resonant antenna 708' in the stationary antenna assembly. The dashed lines 804 are indicative of the magnetic field that couples the loop antenna 710' and the EID tag 800.

When an activation signal is applied by the portable RFID reader's electronic circuitry to the resonant antenna 703', a time varying magnetic field radiates in the vicinity of the resonant antenna 703'. The inductive coupling between the resonant antenna 703' in the portable RFID reader and the resonant antenna 708' located within the stationary antenna assembly 801 causes the resonant antenna 708' to generate an electrical signal on the electrical connection 705'. The electrical signal, when input to the loop antenna 710', causes the loop antenna 710' to generate a time varying magnetic field similar to the time varying magnetic field originally generated by the resonant antenna 703' in the portable RFID reader. When an EID tag 800 is sufficiently close to the loop antenna 710', the EID tag 800 becomes activated and provides its identification data using any one of many possible schemes to the reader. The loop antenna 710' captures the tag's data signal and the captured data signal is conveyed to the portable RFID reader via the electrical connection 705' and the inductive coupling between the resonant antenna 708' in the stationary antenna assembly 801 and the resonant antenna 703' in the portable RFID reader 700'. The portable RFID reader is able to process the tag's data signal in ways that result in the reproduction of the tag's data information. In a number of portable RFID readers, the tag's information data can be (a) displayed on an integral readout, (b) stored internally for later access, (c) conveyed by cable or by wireless means to another recording device, or can be processed in several of these or other additional manners. In addition to being able to read a tag in the manner described immediately above, the reader 700' retains its ability to read a tag using its integral antenna 703' while the stationary antenna assembly 801 is physically attached to and inductively coupled with reader 700'. Having two tag reading locations at reader antenna 703' and loop antenna 710' can have advantages in some configurations and applications.

Figure 9:
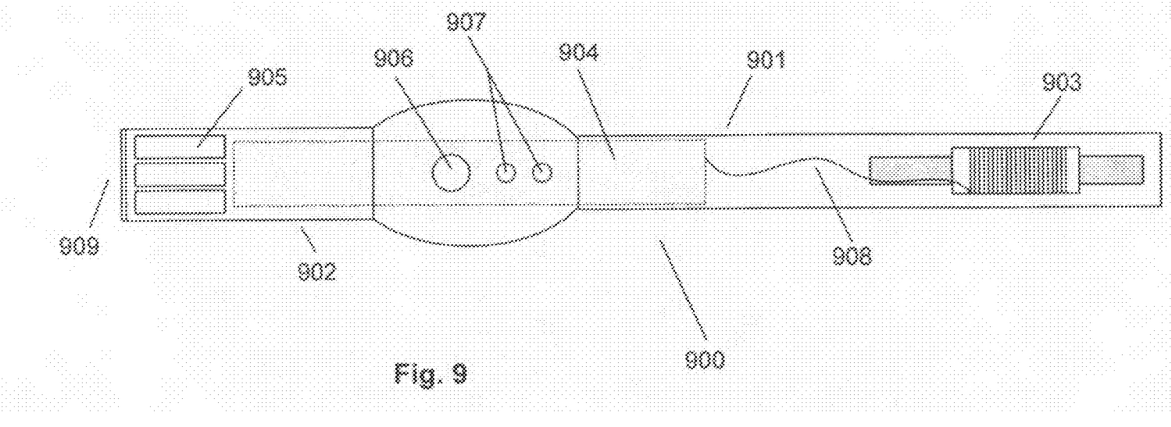
FIG. 9 illustrates a portable RFID reader system in accordance with an embodiment of the invention.

A portable RFID reader that can be used in an RFID reader system in accordance with an embodiment of the invention is shown in FIG. 9. The portable RFID reader 900 includes a non-metallic enclosure housing 901 having a handle grip 902, which encloses the reader components, including a ferrite antenna 903, the reader's electronic circuitry 904, a battery power source 905, an activation switch 906, indicator lights 907, and antenna connecting wires 908. Each end of the RFID reader's packaging is sealed with an end cap 909. The RFID reader 900 includes a capacitor similar to the capacitor 201 shown in FIG. 2 as part of its electronic circuitry 904.

The reader's electronic circuitry 904 is configured to generate an activation signal and to receive data signals from the ferrite antenna 903. The reader's electronic circuitry 904 generates an activation signal in response to the depression of the activation switch 906. The results of an attempt to obtain identification data are displayed using the indicator light(s) 907. In the illustrated embodiment, there are two indicator lights 904 that indicate either a successful read or an unsuccessful read. In other embodiments, an audible indicator is used and/or the acquired information is displayed on a screen included in the portable RFID reader. In many embodiments, the acquired information is communicated to an external device via a wired and/or wireless connection.

Although a specific embodiment of a portable RFID reader is shown in FIG. 9, portable RFID readers suitable for use in a RFID reader system in accordance with embodiments of the invention can have a variety of shapes, sizes, internal circuitry and physical features. In a typical embodiment, the portable RFID reader is cylindrical in shape, having a cross sectional diameter of 30 millimeters (mm) and a length that is typically between 30 centimeters (cm) and 75 cm. The ferrite antenna 910 is typically located at the end opposite the end where the handle and user interface are located, thus allowing a wand shape that can be held in one hand by the user and pointed at an EID tag or a resonant antenna unit in a stationary antenna assembly, thereby minimizing the distance between the ferrite antenna 300 and the EID tag 409 or stationary antenna assembly that is being scanned.

Figure 10:
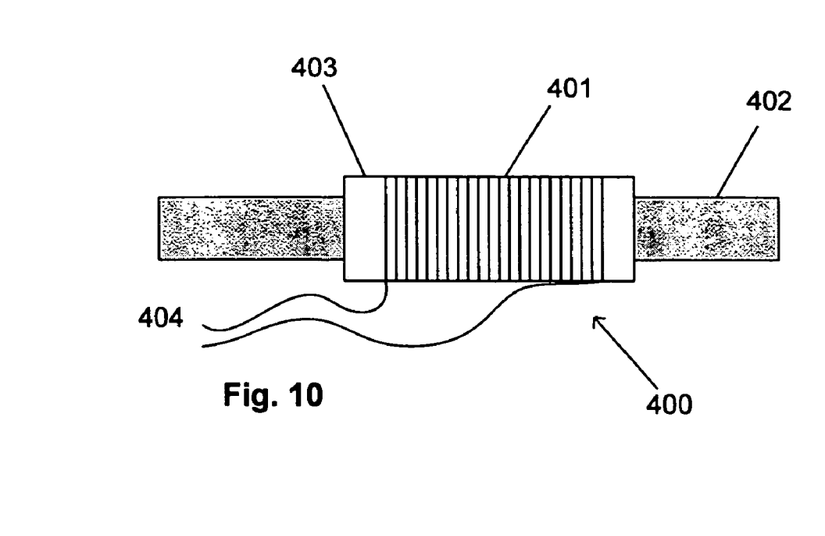
FIG. 10 illustrates a ferrite antenna inductor that can be used to implement a resonant antenna in accordance with an embodiment of the invention.

Referring to FIG. 7, the portable reader can have the alternate physical configuration represented by 701. In this embodiment, the reader is not limited to being a handheld portable reader and its antenna is not limited to being contained within the same enclosure. As illustrated, reader 751 is electrically connected via cable 754 to antenna assembly 753 which encloses resonant antenna 752. Preferably, antenna assembly 753 is physically compatible with antenna 704 of the stationary antenna system. In an alternate embodiment, antenna assembly 753 would be integral to reader 751, and antenna assembly 704 of the stationary antenna assembly would detach from mounting support 714 and attach to antenna of reader 751 in a manner conducive with inductively coupling the two antennas. Reader 751 may also include ancillary functions related to data collection and processing that correlate with animal identification As discussed above, stationary antenna assemblies in accordance with embodiments of the present invention include a pair of antennas that are electrically connected. The resonant antenna is often a ferrite antenna, which can be constructed using a ferrite antenna inductor. A ferrite antenna inductor in accordance with an embodiment of the invention is shown in FIG. 10. The ferrite antenna inductor 400 includes a wire 401 wound on a ferrite core 402, the combination is often referred to as a "ferrite-core antenna". The ferrite core 402 in this example has a cylindrical geometry, but could alternately have a rectangular cross sectional geometry or another geometry. Multiple turns of wire 402 are wound on an insulator form 403, and the coil most frequently has two electrical connections 404, one at each end of the wire turns. Ferrite-core antennas are highly effective in compact short-range applications inasmuch as the ferrite core accentuates the inductance value and concentrates the pattern of the radiated magnetic field. Furthermore, the inductance value can be adjusted by shifting the position of the coil 401 wound on the insulator form 403 relative to the ferrite core 402. By adjusting the inductance value, a resonant antenna circuit can be easily tuned to a precise $F_R$ value for a specific application, and such tuning optimizes the antenna's performance. Obviously, the coil 401 can be wound directly on the ferrite core 402 if there is no necessity in a particular application for adjusting the inductance value, or if the inductance value is to be adjusted by altering the number of wire turns of the coil 401 on the ferrite core 402.

Although a ferrite antenna inductor is shown in FIG. 10, many embodiments of the invention utilize resonant antennas that incorporate antenna inductors constructed using multiple turns of wire (which can have any imaginable geometric shape) wound on a dielectric core or bobbin, the core or bobbin having no influence on the resulting inductance value. Such an antenna inductor is often referred to as an "air-core antenna".

Figure 11:
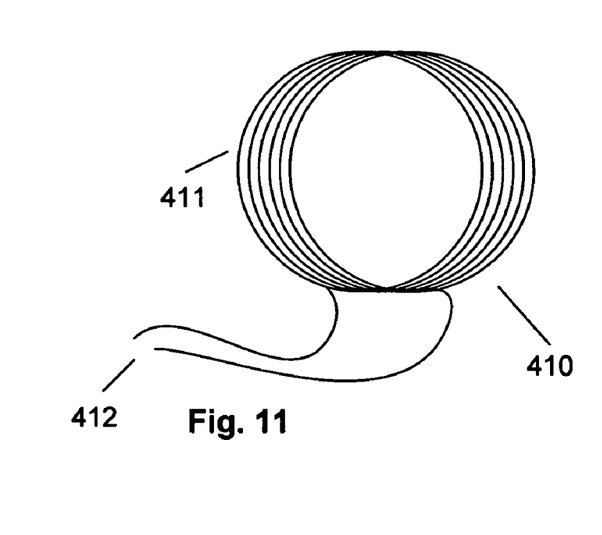
FIG. 11 illustrates an inductive loop that can be used to implement a loop antenna in accordance with an embodiment of the invention.

As discussed above, a stationary antenna assembly in accordance with an embodiment of the invention includes a resonant antenna connected to a loop antenna. Loop antennas are generally air-core in construction and are normally physically larger than a ferrite antenna. In many instances, loop antennas provide larger reading zones and greater reading distances than ferrite-core antennas. An inductive loop that can be used in a loop antenna in accordance with an embodiment of the invention is shown in FIG. 11. The inductive loop 410 includes a number of coils of wire 411 that end in two electrical connections 412. Although the inductive loop 410 is shown as circular, an inductive loop can include one or more turns of an electrically conductive material, such as copper wire, wound in a circular, elliptical, triangular, rectangular, or other two dimensional geometry. In addition, the loop can be deformed to create effective 3-dimensional antennas, and can have multiple series or parallel wired segments that can be physically and electrically disposed in limitless imaginable ways.

The ferrite antenna inductor and the inductive loop shown above are typically combined with one or more capacitors during the construction of an antenna assembly. In many embodiments, both the ferrite antenna inductor and the inductive loop are connected with separate capacitors in accordance with the parallel wiring scheme shown in FIG. 3. In many embodiments, the inductance of the ferrite antenna inductor and the inductive loop and capacitance of capacitors are determined to provide a desired resonant frequency using the resonant frequency equation, $F_R = \frac{1}{2}\pi \sqrt{LC}$, where $F_R$ is the frequency used for activating the EID tag. Other configurations for the capacitors are possible. For example, a single capacitor having a value equal to the sum of the two separate capacitors could be used. However, embodiments including separate inductor and capacitor sets have the advantage of allowing each inductor and capacitor set to be individually tuned to frequency $F_R$.

Figure 12:
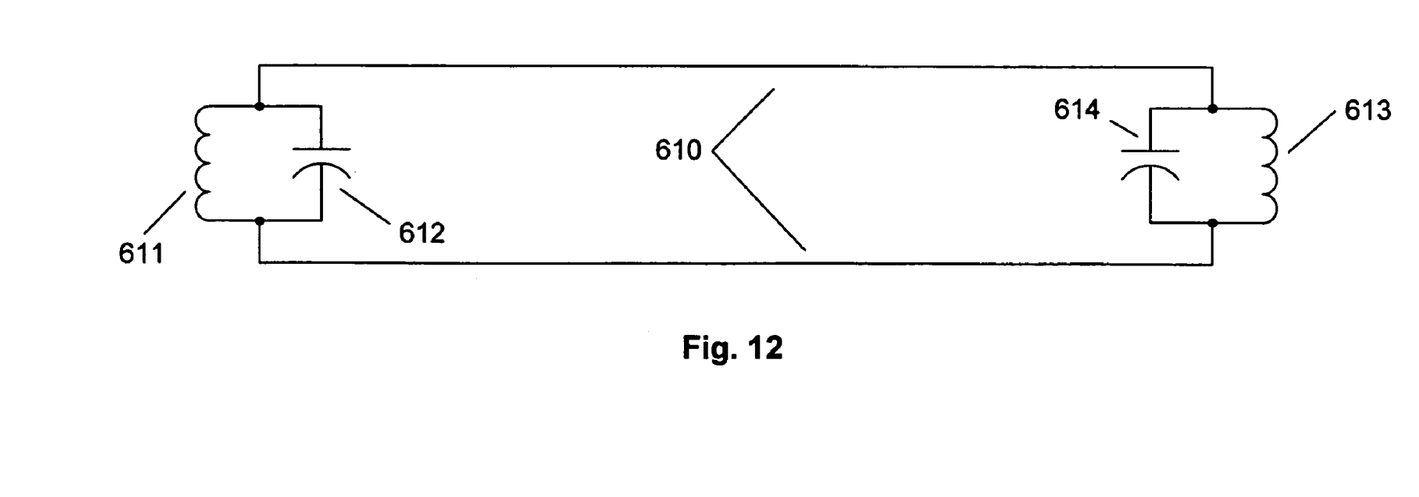
FIG. 12 is a circuit diagram of a stationary antenna assembly in accordance with an embodiment of the invention.

A wiring configuration for a stationary antenna assembly in accordance with an embodiment of the invention is shown in FIG. 12. In FIG. 12, inductor 611 and capacitor 612 correspond to a ferrite antenna inductor connected in a parallel configuration with a capacitor and the inductor 613 and the capacitor 614 correspond to an inductive loop connected in a parallel configuration with a capacitor. The two lines 610 connecting the inductor/capacitor pairs constitute the electrical conductor pair 705 shown in FIG. 8.

Referring back to FIG. 8, many embodiments of the invention include portable RFID readers 702' and stationary antenna assemblies that incorporate ferrite antennas 703' and 708' that are identical components. However, this need not be the case. The resonant antennas need not be identical. For example, the resonant antenna used in a stationary antenna assembly in accordance with an embodiment of the invention can include loops capable of circumscribing a resonant antenna in a portable RFID reader.

While the above description contains many specific embodiments of the invention, these should not be construed as limitations on the scope of the invention, but rather as an example of one embodiment thereof. For example, although stationary antenna assemblies are described above that include ferrite antennas and loop antennas, stationary antenna assemblies in accordance with embodiments of the invention can be constructed that include other combinations of antennas. In addition, antenna assemblies can be used that are not stationary. Accordingly, the scope of the invention should be determined not by the embodiments illustrated, but by the appended claims and their equivalents.

What is claimed is:

1. A radio frequency identification reader system, comprising:
   a portable reader, including:
   reader circuitry configured to generate an activation signal;
   a first resonant antenna, where the first resonant antenna is electrically connected to the reader circuitry;
   a reader housing containing the reader circuitry;
   a plurality of stationary antenna assemblies, where each stationary antenna assembly includes:
   a resonant antenna unit including a resonant antenna housing and a second resonant antenna contained within the resonant antenna housing, where the second resonant antenna is tuned to a resonant frequency;
   a loop antenna unit including a loop antenna housing and a loop antenna contained within the loop antenna housing and configured to provide a larger reading zone and greater reading distance than the first resonant antenna of the portable reader, where the loop antenna is tuned to the resonant frequency; and
   an electrical connection between the resonant antenna unit and the loop antenna unit;
   wherein the resonant antenna units of the stationary antenna assemblies are located a distance apart so that the first resonant antenna in the portable reader is only capable of inductively coupling to one resonant antenna in a stationary antenna assembly at a time;
   wherein the housing of the resonant antenna unit includes a mechanical coupler configured to align the first resonant antenna in the portable reader with the second resonant antenna in each stationary antenna assembly.

2. The radio frequency identification reader system of claim 1, wherein the reader circuitry is configured to generate an activation signal that causes the first resonant antenna to generate a time varying magnetic field.

3. The radio frequency identification reader system of claim 2, wherein:
   the portable reader includes an activation switch; and
   the reader circuitry is configured to generate the activation signal in response to the activation switch being pressed.

4. The radio frequency identification reader system of claim 2, wherein:
   the first resonant antenna and the second resonant antenna are configured so that the second resonant antenna generates a time varying electrical signal indicative of a time varying magnetic field generated by the first resonant antenna;
   the electrical connection is configured to convey electrical signals from the second resonant antenna to the loop antenna; and
   the loop antenna is configured to generate a time varying magnetic field indicative of a time varying electrical signal generated by the second resonant antenna.

5. The radio frequency identification reader system of claim 1, wherein the loop antenna is configured to receive information data from an electronic identification tag, which automatically responds to the activation signal.

6. The radio frequency identification reader system of claim 5, wherein:
   the loop antenna is configured to generate a time varying electrical signal indicative of received information data and to provide the electrical signal to the second resonant antenna via the electrical connection;
   the second resonant antenna is configured to generate a time varying magnetic field indicative of an electrical signal generated by the loop antenna;
   the first resonant antenna is configured to generate a time varying electrical signal indicative of a time varying magnetic field generated by the second resonant antenna and to provide the time varying electrical signal to the reader circuitry via the electrical connection between the first resonant antenna and the reader circuitry; and
   the reader circuitry is configured to extract information data from the time varying electrical signal received from the first resonant antenna.

7. The radio frequency identification reader system of claim 1, wherein at least one of the resonant antennas is a ferrite antenna.

8. The radio frequency identification reader system of claim 7, wherein the ferrite antenna comprises:
   a ferrite core;
   an insulating form surrounding a portion of the ferrite core; and
   a coil wrapped around the insulating form.

9. The radio frequency identification reader system of claim 8, wherein the ferrite core has a circular geometry.

10. The radio frequency identification reader system of claim 1, wherein both resonant antennas are ferrite antennas.

11. The radio frequency identification reader system of claim 10, wherein both of the ferrite antennas include a circular geometry, have the same cross-section geometry and include the same number of turns.

12. The radio frequency identification reader system of claim 1, wherein at least one of the resonant antennas is an air-core antenna.

13. The radio frequency identification reader system of claim 1, wherein the electrical connection between the second resonant antenna and the loop antenna includes a pair of wires.

14. The radio frequency identification reader system of claim 1, wherein:
the first resonant antenna and second resonant antenna have circular cross sections; and the mechanical coupler is configured to attach the portable reader housing to the housing of the resonant antenna unit so that the first and second resonant antennas are axially aligned.

15. The radio frequency identification reader system of claim 1, further comprising an antenna identification tag located proximate each resonant antenna unit.

16. A method of obtaining identification data from an animal electronic identification tag in a location tagged with a location electronic identification tag using a portable reader having a resonant antenna and configured to generate an activation signal, comprising:
positioning the portable reader so that the resonant antenna is inductively coupled to a first antenna that is electronically connected to a second antenna, where the second antenna is configured to provide a larger reading zone and greater reading distance than the resonant antenna of the portable reader;
wherein a housing of the first antenna includes a mechanical coupler configured to align the resonant antenna in the portable reader with the first antenna when positioning the portable reader so that the resonant antenna is inductively coupled to the first antenna;
generating an activation signal in the reading zone of the second antenna by generating an activation signal using the portable reader;
reading identification data from the animal electronic identification tag using the portable reader, when the animal electronic identification tag is located within the reading zone of the second antenna and the animal electronic identification tag is configured to automatically respond to the activation signal; and
positioning the portable reader so that the location electronic identification tag is located within the reading zone of the portable reader's resonant antenna;
generating an activation signal using the portable reader and directly reading identification data from the location electronic identification tag using the portable reader, where the location electronic identification tag is configured to automatically respond to the activation signal.

17. method of claim 16, wherein the reader includes a ferrite antenna.

18. The method claim 16, wherein the first antenna is a ferrite antenna.

19. The method of claim 16, wherein the second antenna is a loop antenna.

20. The radio frequency identification reader system of claim 1, wherein:
the second resonant antenna includes loops configured to circumscribe the first resonant antenna; and
the mechanical coupler is configured to align the portable reader so that the first resonant antenna is positioned within the loops of the second resonant antenna.

21. The radio frequency identification reader system of claim 1, wherein the second resonant antenna is tuned to the resonant frequency using a tuning capacitor.

22. The radio frequency identification reader system of claim 21, wherein the loop antenna is tuned to the resonant frequency using a second tuning capacitor.

23. A radio frequency identification reader system, comprising:
a portable reader, including:
reader circuitry configured to generate an activation signal;
a first resonant antenna, where the first resonant antenna is a ferrite antenna electrically connected to the reader circuitry;
a reader housing containing the reader circuitry;
wherein the reader circuitry is configured to read identification data from animal electronic identification tags, which are configured to automatically respond to an activation signal;
a plurality of stationary antenna assemblies, where each stationary antenna assembly includes:
a resonant antenna unit including a resonant antenna housing and a mechanical coupler configured to align the first resonant antenna with a second resonant antenna contained within the resonant antenna housing, where the second resonant antenna is tuned to a resonant frequency;
a loop antenna unit including a loop antenna housing and a loop antenna contained within the loop antenna housing and configured to provide a larger reading zone and greater reading distance than the first resonant antenna of the portable reader, where the loop antenna is tuned to the resonant frequency; and
an electrical connection between the resonant antenna unit and the loop antenna unit;
wherein the resonant antenna units of the stationary antenna assemblies are located a distance apart so that the first resonant antenna in the portable reader is only capable of inductively coupling to one resonant antenna in a stationary antenna assembly at a time.

24. The radio frequency identification reader system of claim 23, wherein the second resonant antenna is a ferrite antenna.

25. The radio frequency identification reader system of claim 23, wherein:
the second resonant antenna is a loop antenna that includes loops capable of circumscribing the first resonant antenna; and
the mechanical coupler is configured to align the portable reader so that the first resonant antenna is positioned within the loops of the second resonant antenna.

* * * * *

UNITED STATES PATENT AND TRADEMARK OFFICE
CERTIFICATE OF CORRECTION

| | | |
|---|---|---|
| PATENT NO. | : 7,764,181 B2 | Page 1 of 1 |
| APPLICATION NO. | : 11/825108 | |
| DATED | : July 27, 2010 | |
| INVENTOR(S) | : Robert Stewart | |

It is certified that error appears in the above-identified patent and that said Letters Patent is hereby corrected as shown below:

Title Page, item [56], Please insert

--1,744,036 Brard
3,299,424 Vinding
3,713,148 Cardullo et al.
5,053,774 Schuermann et al.--

Signed and Sealed this
First Day of March, 2011

David J. Kappos
*Director of the United States Patent and Trademark Office*